Jan. 3, 1928.
A. JOHNSON
SLED
Filed Aug. 7, 1925
1,655,228
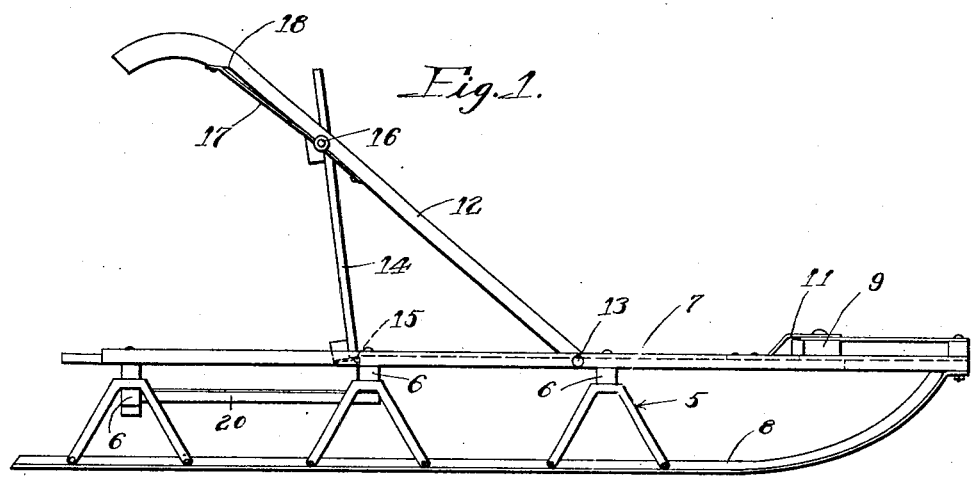
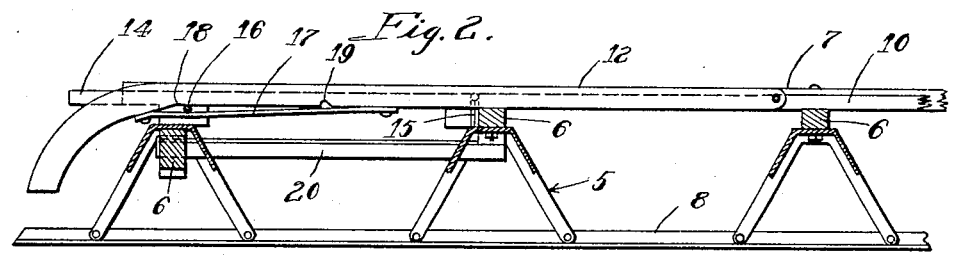
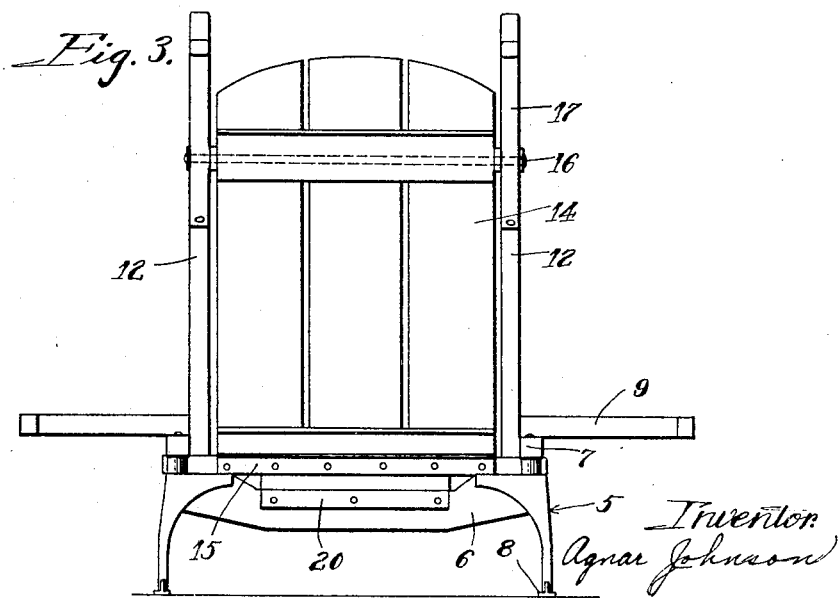
Inventor:
Agnar Johnson
By Wilson & McCaura Attys.

Patented Jan. 3, 1928.

1,655,228

UNITED STATES PATENT OFFICE.

AGNAR JOHNSON, OF ROCKFORD, ILLINOIS.

SLED.

Application filed August 7, 1925. Serial No. 48,911.

This invention relates to sleds.

The principal object of the invention is to provide an improved sled having a wider range of pleasurable uses, being capable of use as an ordinary sled for coasting, hitching and belly flopping or adapted by a simple adjustment to be used after the fashion of a sledge chair, to be pushed or pumped as a pushmobile or scooter by intermittently shoving with one foot while resting the other on the sled, or to be operated as a draft vehicle with the driver running and standing on behind.

In line with the foregoing object my invention provides a sled generally of a conventional form and capable of unencumbered use in the usual ways, but having a rear end section of the top hinged to be raised from a normal horizontal position, flush and coextensive with the sled top, to an upright position to serve as a back rest, there being a pair of handles with which the back rest is raised to upright position and securely locked in such position, while the handles provide a means for pushing and directing the sled. In combination with the handles and back rest, I provide a platform beneath the back rest in its normal position to be uncovered when the rest is raised to upright position and providing a place for the person pushing to stand or to rest one foot while in the act of propelling the sled.

A further feature of my invention resides in the provision of a convertible sled of the character described which is hardly any heavier than the unimproved ordinary sled and which is fully capable of the wider range of uses to which it is intended the sled may be put by virtue of the improvements, the added improvements operating in no way as an encumbrance.

In the accompanying drawing illustrating my invention,

Fig. 1 is a side view of a sled embodying the improvements herein above-described, the sled being shown converted for use after the manner of a sledge chair;

Fig. 2 is an enlarged longitudinal sectional view with my improvements appearing in elevation; and Fig. 3 is a rear view of Fig. 1.

Throughout the views the same reference numerals are applied to corresponding parts.

The sled incorporating my invention comprises a supporting frame 5 having cross-members 6 and longitudinal side members 7 bolted or otherwise secured thereto. A pair of flexible runners 8 are riveted and bolted to the supporting frame and have connection with a foot board or rudder bar 9 hinged to the sled top 10 in a bracket 11, in a well-known manner. The sled top 10 extends longitudinally of the frame 5 between the side members 7. A pair of curved plow handles 12 are pivoted at 13 to the side members 7 on opposite sides of the top 10 and arranged to be raised from a horizontal inoperative position shown in Fig. 2, lying between the top 10 and the side members 7 and flush with the side members, to the inclined operative position shown in Fig. 1. A top portion 14 constituting the rear end section of the top 10, is hinged at 15 to the top 10 at the middle cross-member 6 of the supporting frame. It will hereinafter be referred to as a back rest. The back rest 14 is normally horizontal and lies flush and co-extensive with the top 10 as shown in Fig. 2, but may be raised to the upright position shown in Fig. 1 to serve as a back rest for a passenger seated on the sled. The handles 12 have a sliding connection with the back rest 14 by means of a cross-bar 16 extending from opposite sides of the back rest 14 to engage between the handles 12 and a flat leaf spring 17 fastened to the under sides of the handles. The ends of the cross-bar 16 ride frictionally into a recess 18 provided between the handles 12 and the leaf springs 17 in the lowered position shown in Fig. 2. When the handles are raised to the operative position shown in Fig. 1, the ends of the cross-bar 16 ride into notches 19 provided in the under sides of the handles 12, in order securely to lock the handles with the back rest in the upright position, so that the sled may be operated as a sledge chair until it is desired to reconvert it for ordinary use. The back rest in lowered position covers a platform 20 which constitutes a sub-top and is mounted in the supporting frame 5 in the manner indicated. The platform 20 is uncovered when the back rest is raised to upright position, and serves as a support for the person pushing or directing the sled to stand upon or rest one foot while propelling the sled with the other foot.

The improvements I have described obviously afford a considerable range of pleasurable uses for an ordinary sled and do not give rise to too complicated structure for practical purposes and economical manufacture. Furthermore, the incorporation of my improvements does not render the use of the sled in the conventional way at all cumbersome as the sled is hardly any heavier because of the added parts, and is made no less sturdy and durable. The operation of converting the sled from the ordinary type to the sledge chair type does not involve the use of any tools, nor are there any parts requiring special adjustments or fastening. It is the aim to provide the handles of suitable length to make it comfortable for a person pushing or directing the sled to hold the same and intermittently stand or rest one foot upon the platform similarly as a musher using a sledge chair drawn by huskies. A special feature resides in the fact that a passenger seated on the sled is secure from the danger of falling off by virtue of the fact that the handles extend diagonally downwardly on opposite sides of the back rest and provide arm rests.

I claim:

1. In a sled, the combination of a supporting frame carrying runners, a top mounted on said frame, a pair of handles disposed at opposite sides of said top and pivotally connected with the sled to be raised from a horizontal inoperative position to an inclined operative position, a hinged top portion between said handles arranged to be raised from a position flat as the sled top to an upright position to serve as a back rest, a leaf spring on one of said handles, and a cross-bar extending from said top portion under said leaf spring, there being a recess at one end of said spring to receive said bar in the raised position of said top portion.

2. In a sled, the combination of a supporting frame carrying runners, a top mounted on said frame, a pair of handles disposed at opposite sides of said top and pivotally connected with the sled to be raised from a horizontal inoperative position to an inclined operative position, a hinged top portion between said handles arranged to be raised from a position flat as the sled top to an upright position to serve as a back rest, a leaf spring on one of said handles, and a cross-bar extending from said top portion under said leaf spring, there being a recess at one end of said spring to receive said bar in the raised position of said top portion, and there being another recess at the other end of the spring between the handle and spring to receive said bar in the lowered position of said top portion.

3. In a sled, a supporting frame having runners thereon, a sled top on said frame, said top having a hinged rearward portion arranged normally in the plane of the top but adapted to be raised to a substantially vertical position to serve as a back-rest, said hinged portion having laterally extending projections at the opposite sides thereof near the rearward end of said portion and substantially spaced from its hinged connection with the top, and a pair of handles pivoted at opposite sides of the top substantially forwardly from the last mentioned hinged connection, said handles having a slidable pivotal connection with the hinged top portion on said lateral projections and being arranged normally in a horizontal inoperative position substantially in the plane of the top but arranged to be raised to an inclined operative position whereby to raise the hinged top portion to its back-rest position and at the same time bring the handles into position with respect thereto to serve as lateral supports for a passenger seated on the sled.

4. In a sled as set forth in claim 3 wherein the supporting frame has cross members for supporting the top, and longitudinal side members connecting the cross members, the provision of the handles pivotally mounted at opposite sides of the top between the latter and the side members whereby said handles when lowered from their operative position are arranged to come into engagement with and rest upon the cross members in their horizontal inoperative position.

5. In a sled as set forth in claim 3 wherein the supporting frame has cross members for supporting the top, and wherein the hinged top portion is hingedly connected at one end at one of said cross members and in the lower position thereof is arranged to rest upon another cross member, rearwardly disposed with respect to the last mentioned cross member, the provision of a foot platform fixed to and supported by the two cross members so as normally to be arranged beneath the hinged top portion but arranged to be uncovered for use when the hinged top portion is raised to its back-rest position.

AGNAR JOHNSON.